United States Patent [19]

Modglin et al.

[11] Patent Number: 4,629,211
[45] Date of Patent: Dec. 16, 1986

[54] FRAME AND AXLE FOR HEAVY DUTY TRUCKS

[75] Inventors: Rodger L. Modglin, Kellyville; W. Ray Borthick, Glenpool, Okla.; Timothy W. Roberts, Tulsa, all of Okla.

[73] Assignee: Unit Rig & Equipment Co., Tulsa, Okla.

[21] Appl. No.: 846,471

[22] Filed: Mar. 31, 1986

Related U.S. Application Data

[63] Continuation of Ser. No. 646,687, Aug. 31, 1984, abandoned.

[51] Int. Cl.4 .............................................. B60G 7/00
[52] U.S. Cl. ...................................... 280/688; 180/62; 180/75; 180/88; 180/905; 280/113; 280/125; 280/795
[58] Field of Search ................. 280/79.1, 80 R, 80 A, 280/105, 113, 117, 125, 133, 134, 688, 781, 795, 796, 718, 719, 720; 180/9.5, 56, 62, 75, 85, 88, 312, 905, 906, 75.2

[56] References Cited

U.S. PATENT DOCUMENTS

| | | | |
|---|---|---|---|
| 1,862,099 | 6/1932 | Sheldrick | 180/75.2 |
| 3,840,244 | 10/1974 | Gee et al. | 280/688 |
| 4,086,974 | 5/1978 | Leclerc | 180/9.5 |
| 4,483,406 | 11/1984 | Smith | 180/9.5 |

Primary Examiner—David M. Mitchell
Assistant Examiner—Kenneth R. Rice
Attorney, Agent, or Firm—Head, Johnson & Stevenson

[57] ABSTRACT

This invention relates to a wheel supported heavy load carrying vehicle which comprises a frame upon which a load may be supported. The frame includes a structural cross-member. Unlike the prior art, the spherical bearing is made an integral part of the cross-member. An axle box assembly is used to support the wheels which support the bulk of the load. The box assembly has a nose cone which has a concave bearing which mates with the spherical bearing on the structural cross-member.

5 Claims, 9 Drawing Figures (CONVENTIONAL SYSTEM)

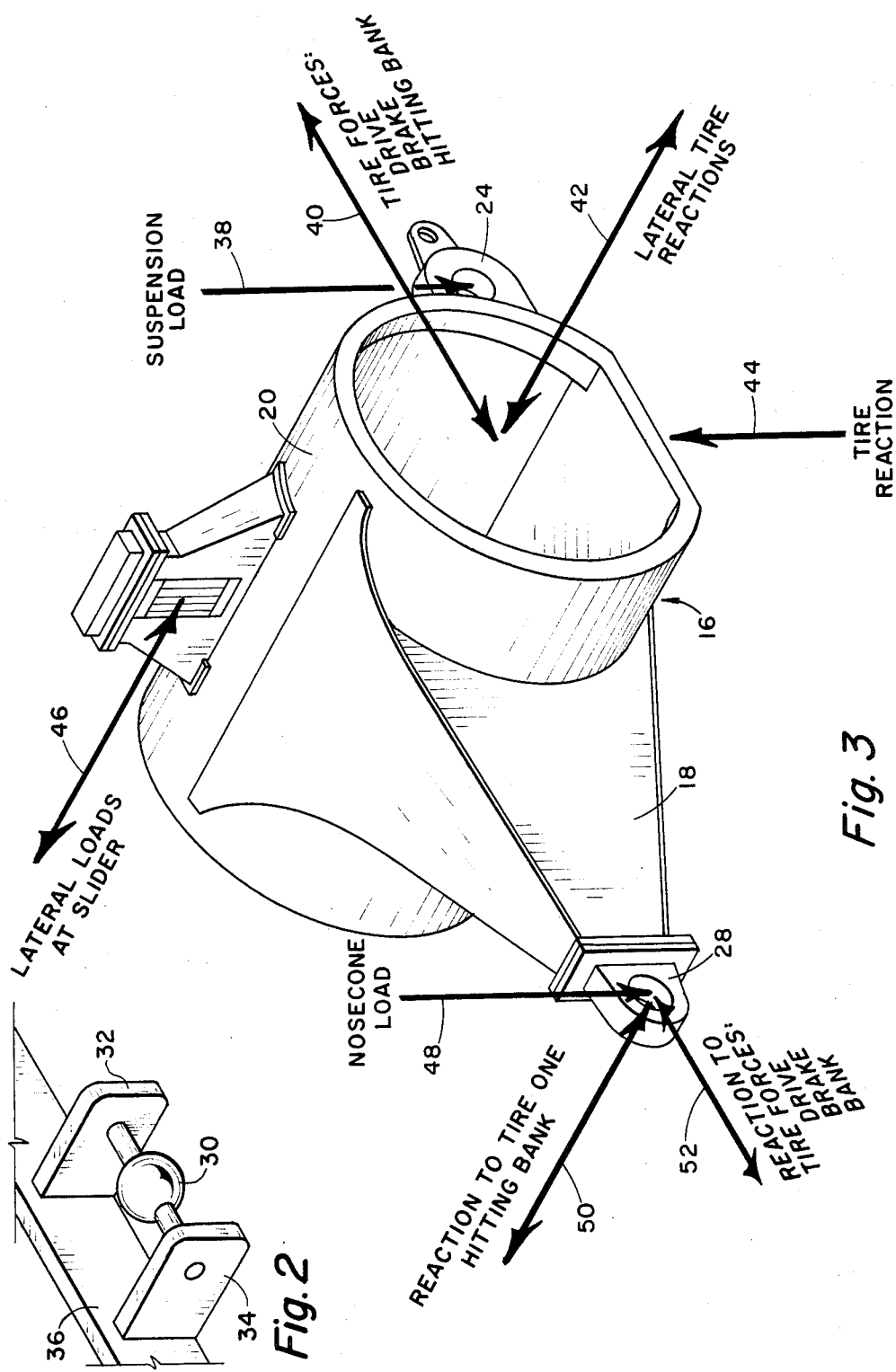

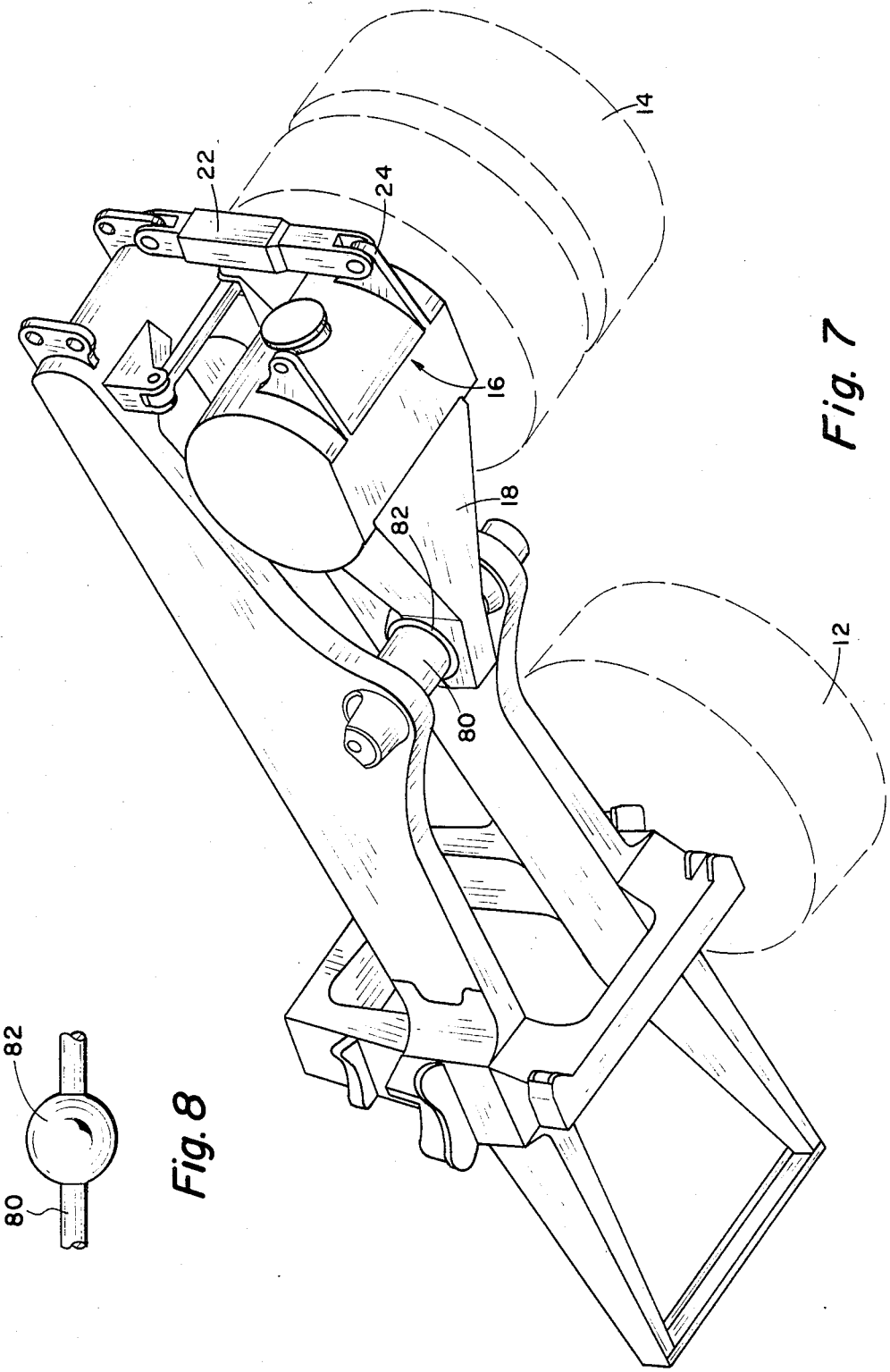

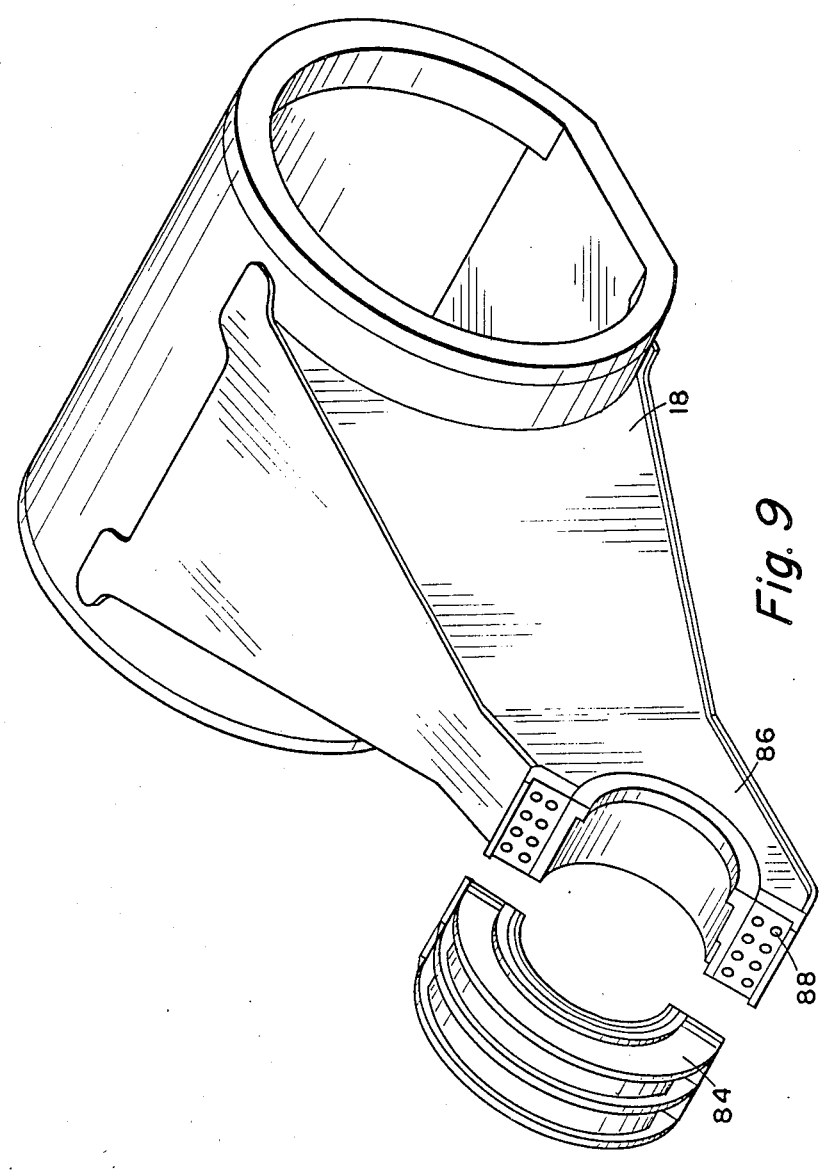

4,629,211

FRAME AND AXLE FOR HEAVY DUTY TRUCKS

This is a continuation of copending application Ser. No. 646,687 filed on Aug. 31, 1984, now abandoned.

BACKGROUND OF THE INVENTION

1. Field of the Invention

This invention relates to heavy duty trucks for carrying heavy loads such as mineral ore, soil and the like.

2. Prior Art

There are many large vehicles for moving heavy loads such as that of iron ore, coal and the like. These vehicles include a heavy frame upon which a load may be supported. A common means for supporting the bulk of the load and for driving the vehicle includes an axle box assembly which supports drive wheels and normally is located under the heavy load. The axle box assembly includes an axle box and a nose cone. Electric motors for driving the drive wheels are supported in the axle box. A cantilever support bracket for a spherical bearing is welded or otherwise secured to a cross-member of the frame. The nose cone is connected to the axle box and has a nose cone concave bearing mating with the spherical bearing from the frame in front of the drive wheels a distance of 10 to 12 feet, for example. As will be pointed out, the cantilever bracket is a source of many problems caused by moments due to various loads.

SUMMARY OF THE INVENTION

This invention is for a wheel supported heavy load carrying vehicle which comprises a frame upon which a load may be supported with the frame including a structual cross-member. A spherical bearing is made an integral part of this structual cross-member. Also provided is an axle box for supporting the drive wheels which propels the vehicle and also forms the basis of the main support from the ground for the bulk of the heavy load.

The axle box assembly is connected to the heavy frame in two respects. (1) To the rear of the wheels, it is supported by suspension struts and by a panhard bar. (2) It is supported in front of the drive wheels by a nose cone which is connected to the cross-member through the spherical bearing. The nose cone is provided with a concave bearing which mates with the spherical bearing of the cross-member. The nose cone of the axle box assembly is supported by a spherical bearing which is an integral part of the structual member. We eliminate the cantilever bearing support bracket and thus, we eliminate all the moments which were on the cantilever supported bearing of the prior art.

DESCRIPTION OF THE DRAWINGS

A better understanding of the invention and its many advantages can be had from the following descriptions taken in connection with the drawings in which:

FIG. 2 illustrates a cantilever supported bearing for the nose cone of the axle box assembly.

FIG. 3 illustrates the axle box assembly and the loads applied thereto.

FIG. 7 illustrates the structual support of the present invention.

FIG. 8 illustrates the spherical bearing made an integral part of a structual member.

FIG. 9 illustrates the structure of the concave bearing of the nose cone.

DESCRIPTION OF THE PREFERRED EMBODIMENT

Figure 1:
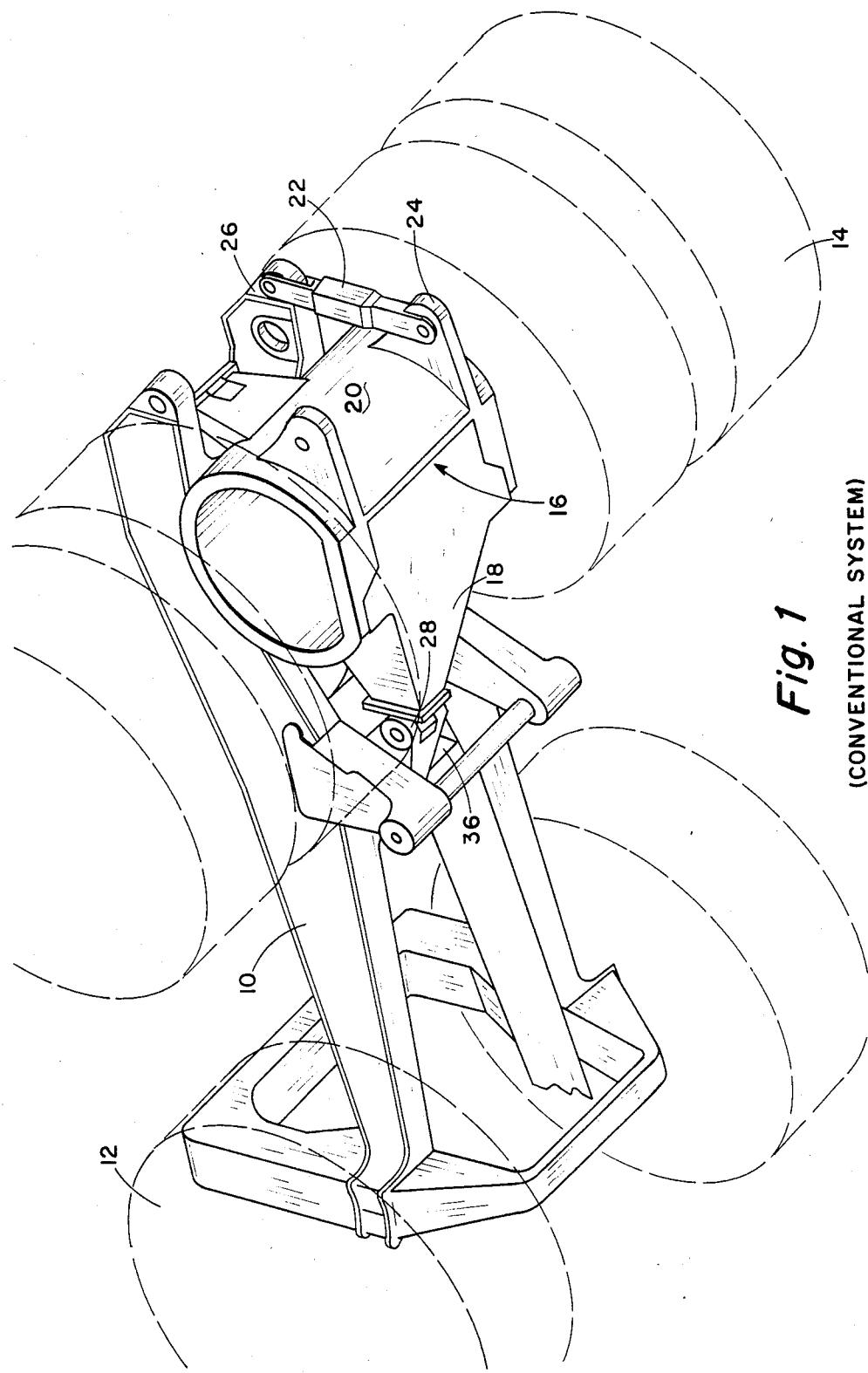
FIG. 1 is a schematic view showing the conventional system for supporting a heavy duty vehicle.

Attention is first directed to FIG. 1 which illustrates the conventional or prior art system for supporting a large load carrying vehicle. It includes a frame system which includes a frame rail 10 from which are supported front wheels 12 and rear wheels 14. The front wheels are supported in a conventional manner to serve both as a steering mechanism and as a minor load support member. Inasmuch as these details are well known in the art, no particular description will be made of them.

The bulk of the load is supported by rear wheels 14 which are normally dual wheels as indicated by the dashed lines. They are supported by an axle box assembly 16 which includes a cylindrical housing 20 and a nose cone 18. The cylindrical housing 20 contain drive means which is normally electrical for driving the wheels 14 and also bearings for supporting the axle of such wheels 14. The housing 20 is supported from the main frame or frame rails 10 by conventional means such as suspension struts 22 which are supported from suspension mounts 24 on the cylindrical housing 20 and suspension mounts 26 which are supported from the frame rail 10.

The axle box assembly 16 is supported at its front end through nose cone 18 which is provided with a bearing housing 28 and is also illustrated in FIG. 3. As shown more specifically in FIG. 2, the bearing housing 28 is made to mate with a spherical bearing 30 supported from cantilever members 32 and 34 which are supported from structual member 36.

This suspension system just described in connection with FIG. 1 and FIG. 2 has worked well, but is not without problems. The major problems are caused by the moments developed by various loads applied to the structure through the cantilever bracket 32, 34. These problems can generally be catagorized into three brackets. (1) Those problems associated with the cantilever bracket which are problems due to the cantilever attachment due to moments generated by loads being put in at the end of the cantilever. (2) Trouble with the self-aligning ball bearing is due to the size restrictions on the particular ball. The bigger the ball, the bigger the brackets 32 and 34 have to be. The bigger the cantilever bracket, the bigger the mount. (3) There are problems with the structure itself, particularly, the frame crossbeam from which the cantilever bracket is attached. This is due to the moments generated by the cantilever bracket itself within the main frame construction. The source of these loads will now be discussed briefly. In this regard, attention is specifically directed to FIG. 3, at this time. Shown thereon, is the axle box assembly 16 having nose cone 18 and cylindrical housing 20. Also shown is a suspension load 38 which is applied through cantilever brackets 24, a force 40 which is due to the tire forces: drive, braking and hitting an embankment; lateral tire reaction force 42; a vertical tire reaction force 44; and a lateral load force 46 at the slider. The slider is merely a connection between the housing 20 and the frame.

Also shown in FIG. 3 are those loads which are specific to the nose cone bearing bracket 28. This includes a vertical force 48 which is due to the nose cone load. A lateral force 50 due to reaction to one of the tires hitting an embankment and a force 52 which is more or less perpendicular to the axis of bearing housing 28 which is due to tire forces due to the driving, braking and hitting the embankment.

Figure 4:
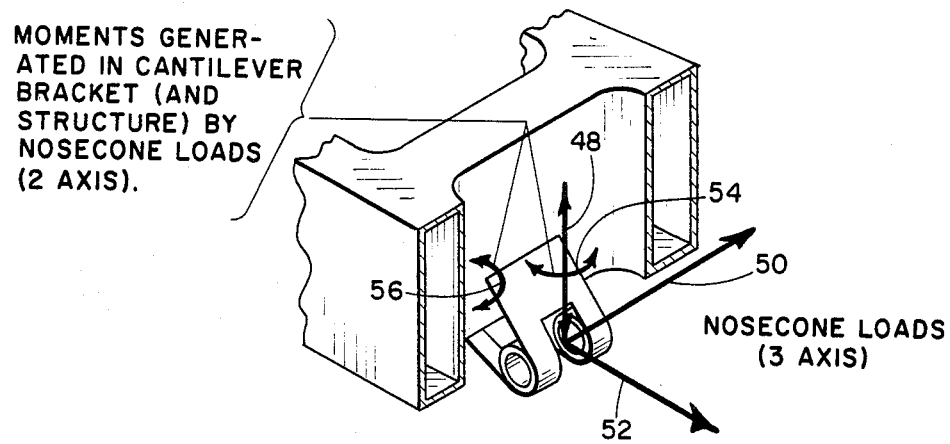
FIG. 4 illustrates the moments generaged in the cantilever bracket by the nose cone loads.
Figure 5:
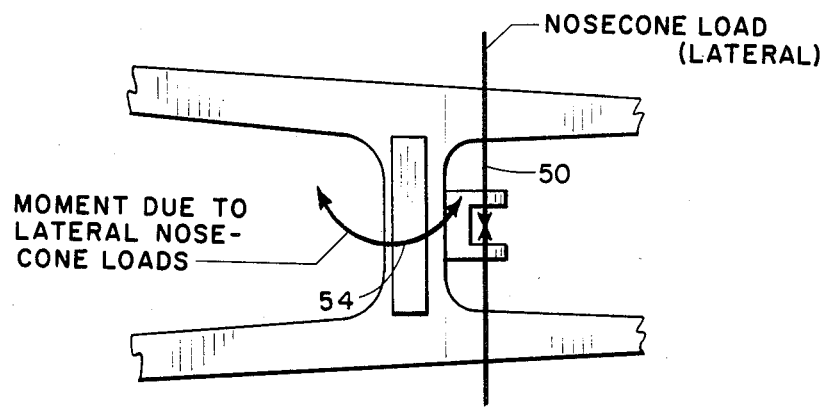
FIG. 5 illustrates the moments in the cantilever of the nose cone bearing due to lateral loads.
Figure 6:
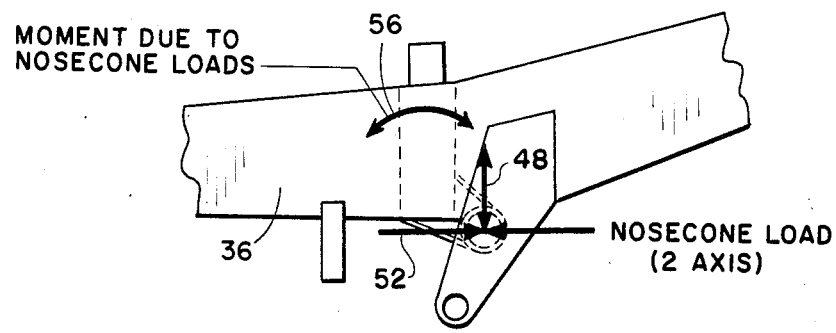
FIG. 6 illustrates the moments due to a nose cone load in two axis.

Attention will next be directed to FIGS. 4, 5 and 6 which show respectively the moments generated due to the nose cone loads, the nose cone lateral loads and the moments on the structure due to the nose cone loads. As shown in FIG. 4, the nose cone loads are in three axis and indicated by forces 48, 50 and 52 as illustrated in FIG. 3. These generate a moment 54 about caused by load 48 and moment 56 caused by load 50. These are moments generated in the cantilever bracket and structure. FIG. 5 shows a nose cone lateral load 50 and the moment 58 due to such load. FIG. 6 shows moment 60 on a structual 36 due to the nose cone load.

The moments illustrated in FIGS. 4, 5 and 6 are all due to loads generated in the cantilever bracket 30, 32. The moments generated here are rather detrimental to the integrity of the overall structure. The cantilever brackets generate moments at the point of attachment due to the loads being put in at the end of the cantilever. These moments are one source of potential trouble due to fatigue or eventually breakage. Another problem has to do with the self-aligning ball as shown in FIG. 2 and supported by the cantilevers 32 and 34. Sometimes, it is desired to have a large ball, but due to the size restrictions on the ball created by the size of cantilevers 32 and 34, it makes it most difficult to have the size ball that is sufficiently large, because the bigger the ball, the bigger the brackets 32 and 34 and the bigger these brackets, the bigger the moments will be generated. A third general problem is that these moments are generated in the structure itself as shown in FIG. 6, that too is a source of potential fatigue problem and eventual breakage with the frame itself.

Attention is next directed to FIG. 7 showing my improved structure which eliminates the moments illustrated in FIGS. 4, 5 and 6 and all the associated problems. In this device, we have nose cone 18 connected directly to our structual cross-member 80. We do not have a cantilever support bracket for the bearing. In our structure, spherical bearing 82 is made integral with the cross-member 80. This is shown clearly in FIG. 8. Attention is now directed to FIG. 9 in which nose cone 18 is provided with concave bearing halves which includes upper section 84 and lower section 86 into which spherical bearing 80 fits. The upper and lower sections are held together by bolts through holes 88. Spherical bearing 82 may be made an integral part of the structual cross-member 80 or it can be welded thereto. The bearing 82 is fixed to cross-member 80 and there is no relative movement between spherical bearing 82 and cross-member 80. The only relative movement is between spherical bearing 82 and the concave bearings 84, 86. Thus, if there is wear of the spherical bearing 82, it can be removed and replaced without replacing the structual member 80. This is another important feature of our invention in that it further protects the actual structure itself. It is also important to note that with our invention as shown in FIG. 7, that there is not nearly the constraints on the size of the spherical bearing 82 as there was on the bearing 30 of the embodiment of FIG. 2. Spherical bearing 82 in mating bearing housing 84 and 86, can be made of any material such as steel in keeping with good metallurgical practices.

While the invention has been described with a certain degree of particularity, it is manifest that many changes may be made in the details of the construction without departing from the spirit or scope of the disclosure. It is understood that the invention is not limited to the embodiments set forth herein for the purposes of exemplification, but is limited only by the scope of the attached claim or claims, including the full range of equivalancy to which each element thereof is entitled.

What is claimed is:

1. A support structure for a heavy load carrying vehicle which comprises:
   a frame upon which a load may be supported, said frame including a rigid structural cross-member spaced intermediate the ends of said frame;
   a spherical inner bearing made an integral part of said cross-member and intermediate the ends thereof;
   an axle box for supporting drive wheels;
   a first support member rigidly connected to said axle box and having a concave outer bearing mating with said spherical inner bearing supporting part of the load, thrust and side forces;
   a second support member connected to the side of said axle box opposite side from that to which said first support member is attached;
   support means connecting said frame and said second support member.

2. A vehicle as defined in claim 1 in which said spherical inner bearing is welded to said cross-member.

3. A vehicle as defined in claim 1 in which said concave outer bearing is made of two parts connectable by bolts.

4. A support structure for a large wheel supported heavy load carrying vehicle comprising:
   a frame having a front end and a rear end upon which said load is placed, said frame including a structural cross-member spaced intermediate the said ends and a spherical-like bearing which is an integral part of and fixed to said cross-member and having a common axis therewith and located intermediate the ends of the cross-member.

5. A support structure for a large wheel supported heavy load carrying vehicle comprising:
   a frame having substantially two parallel members upon which said load is placed, said frame including a structural cross-member connected between said parallel members and a spherical bearing fixed to said cross-member and having the same axis;
   an axle assembly for supporting drive wheels, said axle assembly including an axle and a nose cone connected to and extending from one side of said axle;
   said nose cone having a concave bearing mating with said spherical bearing;
   a support member connected to and extending from the side of said axle opposite the side from which said nose cone extends;
   support means connecting said frame and said axle.

* * * * *